Oct. 31, 1950     L. R. BUCKENDALE     2,527,528
BRAKE MECHANISM
Filed April 9, 1945     2 Sheets-Sheet 1
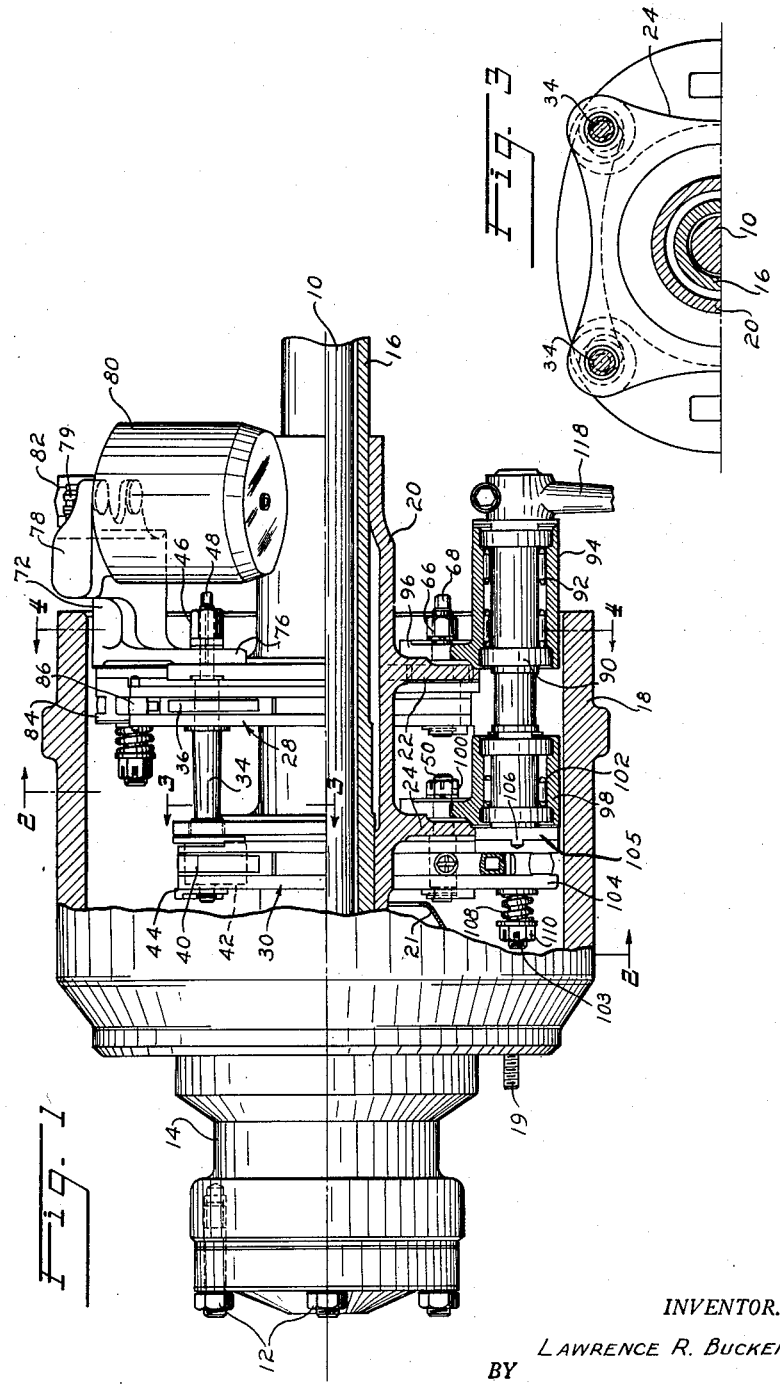
INVENTOR.
LAWRENCE R. BUCKENDALL
BY
*Strauch & Hoffman*
ATTORNEYS Oct. 31, 1950     L. R. BUCKENDALE     2,527,528
BRAKE MECHANISM
Filed April 9, 1945     2 Sheets-Sheet 2
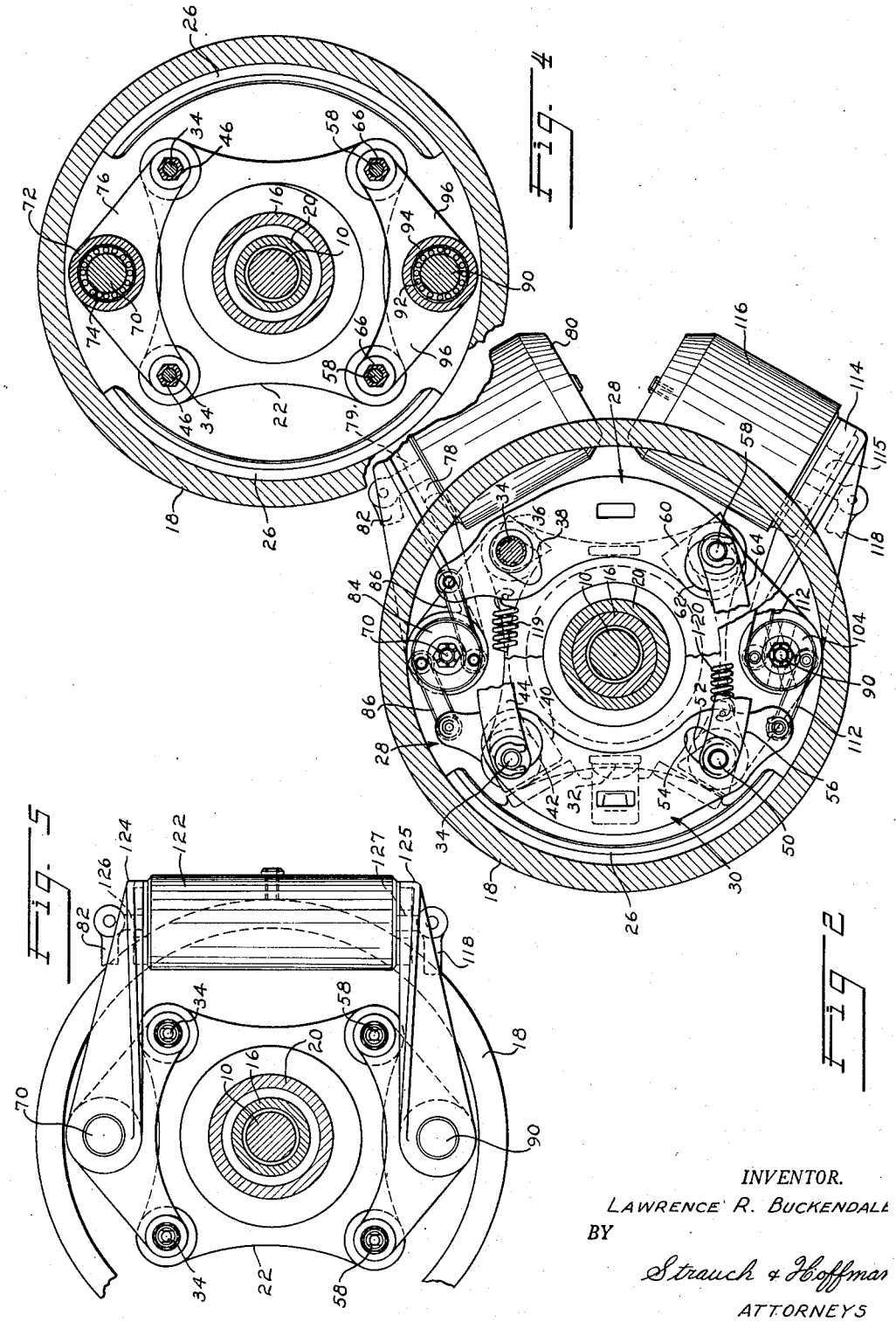
INVENTOR.
LAWRENCE R. BUCKENDALE
BY
Strauch & Hoffman
ATTORNEYS Patented Oct. 31, 1950

2,527,528

UNITED STATES PATENT OFFICE 2,527,528

BRAKE MECHANISM

Lawrence R. Buckendale, Detroit, Mich., assignor to The Timken-Detroit Axle Company, Detroit, Mich., a corporation of Ohio Application April 9, 1945, Serial No. 587,324

12 Claims. (Cl. 188—79)

1

This invention relates to brake mechanism, designed more particularly for application to heavy duty vehicles, or other uses where the efficent braking of heavy loads is required.

In brake mechanism for trucks, buses and other heavy duty vehicles, of the internal expanding type, it has heretofore been the common practice to employ an oversize brake drum with a single pneumatically or hydraulically actuated braking unit mounted therein and embodying two or more circumferentially spaced brake shoes. Such large heavy brake drums materially increase the weight of the vehicle, and as the brake assembly required support externally of the brake drum, the making of necessary adjustments to compensate for brake lining wear was a difficult and laborious task, necessitating partial disassembly.

Therefore, it is a general aim and purpose of the present invention to overcome the above objections by the provision of a duplex braking mechanism embodying two separate braking unit assemblies mounted in axially spaced apart relation within a common brake drum of standard size or diameter and with the respective sets of brake shoes in such relation with each other and the drum wall that mechanical stresses incident to the application of braking torque will be substantially uniformly distributed through the wall of the brake drum both circumferentially and axially thereof and reaction forces on the parts of the braking units equalized.

It is another important object of my invention to provide easily accessible means for quickly adjusting the brake shoes of both the inner and outer brake unit assemblies to compensate for lining wear and which will not require the disassembly of any of the parts of either braking unit.

It is a further object of the invention to provide a duplex brake mechanism, in which the several parts of the two braking units are mounted in accurately assembled relation to each other upon a common adaptor sleeve rigidly fixed upon a vehicle axle housing.

An additional object of the invention resides in the provision of simple bearing or supporting means for the actuating shafts for the brake shoe operating levers of the respective units, which may be secured in assembled position by means of the anchor pins mounting said shoe operating levers upon the adapter sleeve.

The several novel features of the invention as above characterized are combined in a compact organization of comparatively small size and in which the several mechanical parts are of simple

2 and durable structural form so that long life and consistently efficient functional service is realized at minimum maintenance expense.

With the above and other objects in view, the invention resides in the improved brake shoe mechanism and in the construction and relative arrangement of its several parts, as will hereinafter be more fully described, illustrated in the accompanying drawings and subsequently incorporated in the subjoined claims.

In the drawings wherein I have illustrated one simple and practical embodiment of my invention and in which similar reference characters designate corresponding parts throughout the several views.

Figure 1 is a side elevation, partly in vertical section, illustrating one practical embodiment of the present invention;

Figure 2 is a transverse sectional view partly broken away and taken substantially on the line 2—2 of Figure 1, one of the inner brake shoes and its operating lever being removed;

Figure 3 is a fragmentary transverse section taken substantially on the line 3—3 of Figure 1;

Figure 4 is a transverse section taken substantially on the line 4—4 of Figure 1; and Figure 5 is an inner end elevation showing a common fluid operated actuating unit for the two brake assembly units.

Referring in further detail to the drawings, for convenient illustration, one practical application of the invention as a vehicle wheel brake is shown. As seen in Figure 1, the vehicle axle shaft 10 is rigidly connected at its extremity by means of suitable bolts 12 to the outer end of a wheel hub 14 of standard construction which is rotatably supported in conventional manner, by means of the suitable anti-friction bearings upon the end of the axle housing 16. To the inner end of the wheel hub 14, the outer end of an axially elongated brake drum 18 is rigidly bolted as at 19. An oil slinger 21 is secured for rotation with hub 14 to prevent oil from the bearings inside the tub from entering the brake assembly.

For the purpose of quickly and accurately assembling the brake drum with my novel braking mechanism, all parts of said mechanism are preferably mounted upon a single adapter member, which, as herein shown, is in the form of a sleeve 20 surrounding the axle housing 16 and welded or otherwise rigidly fixed thereto. Intermediate of its ends this adapter is provided with integral longitudinally spaced radial flanges 22 and 24 respectively, disposed in parallel planes normal to the sleeve axis. Upon each of these sleeve flanges a brake unit assembly is mounted, and in the following description these assemblies will be described with reference to the open end of the drum 18, the outer brake assembly being mounted on the sleeve flange 22 while the inner brake assembly is mounted upon the flange 24. In this disclosure the brake assembly nearest the open end of the brake drum will be called the outer brake assembly while that near the closed end of the drum will be called the inner brake assembly. Sleeve 20 could equally well be mounted on a trailer axle.

Preferably, the two brake unit assemblies are of the same construction, each comprising a pair of brake shoes 26 mounted at diametrically opposite sides of the axle housing for movement toward and away from the inner wall of the brake drum 18. The shoes of the outer brake assembly are actuated by levers 28, while those of the inner brake assembly are actuated by the levers 30. These levers in turn are actuated by pneumatically or hydraulically operated means to be presently described. Each of the levers 28 and 30 is preferably similar in construction to the brake applying levers shown in the United States Letters Patent to Alden et al. No. 2,337,070, December 21, 1943, and is provided with a saddle 32 upon which the associated brake shoe is rockably and slidably supported.

Above the axle housing and at opposite sides of a vertical plane which includes the axis thereof, the flanges 22 and 24 are apertured to rotatably receive the two parallel anchor pins 34, the respective pins being common to the inner and outer brake shoe actuating levers at relatively opposite sides of the drum axis. Upon each anchor pin 34, an abutment member 36 is pivoted and is associated with the upper end of one of the levers 28 of the outer braking unit to cooperate with the upper end of the associated brake shoe. The levers 28 are provided with elongated openings 38 which permit of limited movement of the upper ends of the levers relative to said pins in the brake applying and retracting movement of said levers.

A separate pivoted abutment member 40 is also associated with each of the levers 30 of the inner braking unit, each said abutment member 40 and the upper end of associated lever 30 being pivotally mounted upon an eccentric portion 42 of one of the anchor pins 34. At the inner sides of the levers 30, the two anchor pins 34 are connected by the reinforcing tie member 44. Abutment members 40 and 52 slidably engage the opposite ends of inner shoes 26.

At its outer end each of the anchor pins 34 is threaded to receive a nut 46, and when these nuts are tightened, locking flanges on said pins are pulled into tight engagement with the flange 24 on the adapter sleeve to positively lock the pins 34 against rotation and in adjusted condition. This locking means is similar to that shown in the above identified patent to which reference may be had for a detail understanding thereof. Each of the pins 34 is also formed with a squared inner terminal portion 48 projecting beyond the nut 46 for the application of an adjusting wrench thereto.

At their lower ends, the levers 30 of the inner brake assembly are mounted upon the relatively short anchor pins 50 which are respectively substantially in vertical alignment with one of the upper anchor pins 34. Abutment members 52 pivoted on pins 50 coact with the lower ends of the brake shoes 26 associated with the respective levers, said levers being provided with the elongated openings 54 permitting brake applying and retracting movement thereof relative to the anchor pin 50. The inner ends of these pins are also connected by a reinforcing tie member 56.

It will be readily understood from the above that by loosening the nut 46 and applying a wrench to the squared end 48 of either anchor pin 34, said pin may be rotated so that the eccentric portion 42 thereof coacting with the abutment 40 and the upper end of the lever 30 adjustably positions said lever and the brake shoe relative to the wall of the drum 18 to compensate for lining wear. Rotation of pins 34 does not change the condition of adjustment of the outer brake assembly because the pins 34 are cylindrical and concentric where they pass therethrough. If desired, the eccentric 42 may have eccentric portions of relatively different diameters and different angular relation coacting respectively with the lever 30 and abutment member 40 to adjust the positions of the upper end of the levers and the brake shoe relative to each other and with respect to the axis of the anchor pin, as in the manner fully described in Patent 2,337,070.

The levers 28 of the outer brake assembly are also pivotally mounted at their lower ends upon relatively short anchor pins 58 rotatably supported in the flange 22 of the adapter sleeve 20 in substantial vertical alignment with the upper anchor pins 34 and in axial alignment with the pins 50. An abutment member 60 is pivoted on each of the pins 58 to slidably coact with the lower end of the associated brake shoe 26 associated with the respective levers, said abutments being pivoted upon eccentric portions 62 of the pins 58. Eccentrics 62 also extend into suitable surrounding openings in the lower ends of the levers 28 in similar manner to the adjusting eccentrics 42 for the levers 30 of the inner brake applying unit.

The inner ends of the anchor pins 58 are connected by the reinforcing tie member 64 and their outer ends are threaded to receive the nuts 66, said pins terminating in the squared wrench engaging terminals 68. Means for locking the anchor pins 50 against rotation relative to the flange 22 when the nuts 66 are tightened are similar to that provided for the anchor pins 34. It will thus be understood that the brake shoes and actuating levers of the outer brake assembly may also be readily adjusted by loosening the nuts 66 and rotating the pins 58 to position the eccentrics 62 relative to the axes thereof, as previously described in connection with the adjustment of the inner brake assembly units. Since the adjusting means for the pins 34 as well as the adjusting means for the pins 58 are easily accessible at the open end of the brake drum 18, the necessary adjustment of the inner brake unit assembly may be easily and quickly made, without necessitating disassembly of any of the parts of the outer brake unit assembly.

Upon the outer sides of the flanges 22 and 24, suitable bearing means for the actuator shafts for the outer and inner brake assemblies, respectively, are mounted.

Referring more particularly to Figures 2 and 4 of the drawings, the actuator shaft 70 for the outer brake assembly is journalled in one or more needle bearing assemblies 74 in an elongated bearing housing 72, said housing being provided at one end with laterally diverging arms 76 mounted at their ends upon the anchor pins 34 and secured rigidly against the face of the flange 22 by means of nuts 46. The bearing housing 72 is also provided with an integral support portion 78 for a pneumatic piston and cylinder assembly 80, the piston thereof being operatively connected by a rod 79 with the end of a crank arm or lever 82 fixed to the end of the shaft 70 outside flange 22. A suitable actuator and shaft operating connection of this type is disclosed in United States Letters Patent to Alden Patent No. 2,287,009. A cylindrical head 84 keyed for rotation with the inner end of the shaft 70 is operatively connected with the upper ends of the levers 28 of the outer brake assembly by means of the links 86 pivotally connected at their remote ends with the respective levers and having their adjacent ends pivotally connected with the head 84 above and below the shaft 70.

The actuator shaft 90 for the inner brake assembly is relatively long and has an outer end portion journalled in needle bearings 92 in the bearing housing 94. This housing is similar to the bearing housing 72 and is provided at one end with the diverging arms 96 which are secured upon the outer ends of the lower anchor pins 58 and against the outer face of the flange 22 by means of nuts 66. A second relatively short bearing housing 98 is mounted in similar manner on the outer ends of the lower anchor pins 50 and rigidly secured in position upon the flange 24 by the nuts 100 threaded upon the outer ends of said pins. The housing 98 contains the single needle bearing annulus 102 in which the inner end of actuator shaft 90 is journalled.

As seen in Figure 1, shaft 90 has a reduced extension 103 projecting inwardly from the housing 98 upon which a cylindrical head 104 similar to head 84 is drivingly mounted. The shaft 90 is formed with a flange 105 at the inner side of the bearing sleeve 98 which is provided with a diametral locking key or rib 106 to be received in a groove formed in the adjacent side of the head 104. A strong coil spring 108 between the nuts 110 threaded upon the reduced end of the shaft 90 and adjacent side of the head 104 urges said head which is otherwise axially movable relative to flange 105 into locked engagement with key or rib 106. The head 84 is locked to the actuator shaft 70 for the outer brake assembly in similar manner.

Links 112 have their remote ends pivotally connected with the lower ends of the brake shoe actuating levers 30 while their adjacent ends are pivotally connected with head 104 above and below the actuator shaft 90.

Bearing housing 92 is also provided with an integral support portion 114 for mounting the pneumatic or hydraulic cylinder and piston assembly 116, the piston rod 115 of which is operatively connected with the crank arm or lever 118 fixed to the end of the actuator shaft 90 outside flange 24.

The brake shoe actuating levers of the outer and inner brake assemblies are respectively connected at the ends thereof adjacent the shafts 70 and 90, respectively, by means of the springs 119 and 120, respectively, which normally hold the levers and brake shoes in retracted position with respect to the wall of the drum 18.

It will be understood from the above that, when pressure fluid such as air is simultaneously supplied to the cylinders 80 and 116, the actuator head 84 of shaft 70 will be rotated in an anti-clockwise direction to actuate the levers 28 and shoes 26 of the outer brake assembly unit while simultaneously the actuator head 104 of the shaft 90 is rotated in a clockwise direction to actuate the levers 30 and brake shoes 26 of the inner brake assembly unit. Thus there is simultaneous and equal expansion of the brake shoes so that substantially equal braking contact and pressure of the brake shoe linings of both assemblies with the wall of the brake drum will be obtained. In view of the symmetrical mounting of the inner and outer brake assemblies with respect to the axis of the drum and the arrangement of the two sets of brake shoes longitudinally of the drum wall, an advantageous distribution of dynamic forces is obtained, limiting reaction stresses upon the brake assemblies and also more uniformly distributing strain incident to high braking torque both circumferentially and longitudinally of the drum wall.

It will be understood that the construction of the individual brake units at levers 28 and 30 is not part of the present invention as each may be the same as the unit disclosed in said Patent No. 2,337,070. Furthermore the particular self-centering head construction at 84 and 104 does not comprise by itself part of the present invention as this construction is disclosed and claimed in my co-pending application Serial No. 569,392, filed December 22, 1944, now United States Letters Patent No. 2,435,955, granted February 17, 1948. The present invention relates however to the novel combination of these parts and other parts of the structure herein disclosed for obtaining efficient and practical brake mechanism. Especially novel is the arrangement for making the lining wear adjustment for the inner brake assembly always instantly available, and the structure permitting this operation.

In Figure 5 of the drawings a slight modification is illustrated in which, instead of two separate fluid operated cylinder and piston units for the respective brake assemblies, a single double acting unit is provided in which the cylinder 122 is supported between laterally extending support brakets 124 and 125 rigid with the upper and lower bearing housings 72 and 92, while oppositely acting pistons in said cylinder are operatively connected by piston rods 126 and 127 to the crank arms or levers 82 and 118 of shafts 70 and 90, respectively.

From the foregoing descriptions and the accompanying drawings, the construction, operation and several advantages of the present invention may be readily understood. It will be seen that I have devised a compact brake mechanism, in which two complete brake unit assemblies are operatively mounted in side by side relation within a brake drum of comparatively small diameter, and without requiring the use of special bearing or supporting means externally of the brake drum. At the same time, the present invention provides easily accessible means at the open end of the brake drum, requiring no especial skill for its operation, whereby both of the brake assemblies may be easily and quickly adjusted to compensate for lining wear and insure maximum efficiency in the operation thereof. This novel adjusting means for the brake assemblies eliminates the necessity of disassembling any of the parts of the outer brake assembly unit in order to obtain access to the adjusting means for the inner brake assembly unit. Also by operatively mounting both of the braking units upon a common adapter sleeve, the brake mechanism may be readily applied to a wheel axle housing of standard construction with the requisite stability of the two brake applying units under all normal conditions of operation. It will further be apparent that a braking mechanism embodying the novel features of this invention is particularly desirable for use in connection with heavy duty vehicles where positive operation and high braking efficiency are essential requisites. Although these functional attributes are inherent in the present invention, the organization as a whole is of comparatively small size and will occupy a minimum of space in the vehicle and axle assembly. Also the several mechanical parts of the mechanism are of rugged and durable structural form so that reliable operational performance with low maintenance cost will be realized.

The invention may be embodied in other specific forms without departing from the spirit or essential characteristics thereof. The present embodiments are therefore to be considered in all respects as illustrative and not restrictive; the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In brake mechanism, a drum, inner and outer braking unit assemblies and means for mounting said assemblies in side-by-side relation within the drum, each assembly including a plurality of brake shoes and an actuating lever for each brake shoe, said mounting means comprising anchor pins common to the corresponding actuating levers of the inner and outer unit assemblies, each having terminal means at the open end of the drum whereby said pins may be rotated, and means operatively connected with said anchor pins and coacting with the respective brake shoes and actuating levers of the inner unit assembly to adjustably position said inner brake shoes relative to the drum and compensate for wear.

2. Brake mechanism as defined in claim 1, together with additional anchor pins individual to said corresponding actuating levers and circumferentially spaced from said common anchor pins, said additional anchor pins for the levers of the outer braking unit having terminal means at the open end of the drum to rotate said pins and means coacting with the respective brake shoes and actuating levers of the outer braking unit to adjustably position the same relative to the drum wall.

3. In a vehicle brake, an adapter member adapted to be secured to a non-rotatable axle part, axially spaced mounting means on said member, separately operable brake assemblies mounted on said mounting means, actuating means for one of said brake assemblies supported by one of said mounting means, actuating means for the other of said brake assemblies supported by both of said mounting means, and means for adjusting said other brake assembly movably mounted on both of said mounting means.

4. In brake mechanism, an adapter member, two braking units each comprising a plurality of brake shoes and actuating levers therefor operatively mounted in side-by-side relation upon said adapter member, bearing means associated with the respective units, a common means anchoring said levers and bearing means of the respective units to the adapter member, and individual actuator shafts for the shoe actuating levers of the respective units journalled in said bearing means.

5. Brake mechanism as defined in claim 4, together with fluid pressure operated means mounted on the adapter member and operatively connected to said shafts.

6. In brake mechanism, an adapter sleeve for application to a vehicle axle housing, said sleeve having longitudinally spaced flanges, independently operable braking unit assemblies and means mounting said assemblies in side-by-side relation on said flanges, said mounting means including anchoring members common to both of said assemblies rotatably supported in each of said flanges and having means coacting with one of said braking unit assemblies to adjust the same in a plane normal to the sleeve axis, additional means rotatably mounted in one of said sleeve flanges for adjusting the other of said braking unit assemblies relative to the sleeve axis, and individual actuating means for the respective braking units mounted on the adapter sleeve.

7. In brake mechanism, an adapter sleeve for application to a vehicle axle housing, a plurality of braking unit assemblies and means for mounting said assemblies on the adapter sleeve in side-by-side relation for independent operation in planes normal to the sleeve axis, each of said assemblies including a plurality of brake shoes in symmetrical relation to the sleeve axis, and said mounting means comprising two adjusting members individual to the respective braking unit assemblies rotatably supported upon said adapter sleeve.

8. Braking mechanism as defined in claim 7, in which the said members at the same end of the adapter sleeve are each provided with a terminal operating part manually accessible at the open end of a brake drum cooperatively associated with said braking unit assemblies.

9. In a brake assembly for association with a single brake drum, a non-rotatable axle part having two axially spaced radial flanges thereon, a first pair of circumferentially spaced anchor pins each rotatably mounted in each of said flanges and having adjacent terminals for rotational adjustment of said pins, a second pair of circumferentially spaced anchor pins mounted on one of said flanges, an inner brake shoe assembly including a first pair of brake levers having adjacent ends pivotally connected to said first pair of anchor pins, a third pair of circumferentially spaced anchor pins adjustably rotatable on the other of said flanges and having adjacent terminals for rotational adjustment of said pins, an outer brake shoe assembly including a second pair of brake levers pivotally connected to said third pair of anchor pins, coacting means on said adjustable anchor pins and brake assemblies whereby rotation of said pins effects adjustment of the brake shoes in said assemblies toward and from said drum, means associated with said first pair of brake levers and extending through said outer brake shoe assembly for actuating said inner shoe brake assembly, and means associated with said second pair of levers for actuating said outer brake shoe assembly, both said pairs of adjustable anchor pin terminals being available outwardly of said outer brake shoe assembly.

10. In a brake apparatus, a pair of axially spaced supports, a circumferentially spaced first pair of anchor pins adjustably rotatable in both of said supports, a circumferentially spaced second pair of anchor pins adjustably rotatable in one of said supports, a first pair of brake shoe actuating levers pivoted on said first pair of anchor pins, brake shoe abutments rockably mounted on said pins, brake shoes rockably and slidably connected to said levers and slidably connected to said abutments, an actuator connected to the ends of said levers opposite their pivots on said first pair of anchor pins, a third pair of anchor pins adjustably rotatable in the other of said supports, a second pair of brake actuating levers pivoted at one end on said third pair of anchor pins, further brake shoe abutments rockably mounted on said first and third pairs of anchor pins, and brake shoes rockably and slidably connected to said second pair of levers and slidably connected to said further abutments.

11. Brake apparatus adapted to be mounted within a rotatable brake drum having an open end comprising a pair of individual brake assemblies mounted side by side in axially spaced relation and adapted to be positioned in the space within said drum, each of said brake assemblies comprising a pair of brake shoe actuating levers separately and adjacently pivoted at one end and connected to an actuator at the other end and adjustment mechanism for varying the relation of said shoes with respect to said drum, and means extending from the adjustment mechanism of the inner brake assembly through the pivot axes of the levers of the outer brake assembly to be available at the open end of said drum for adjustment of the inner brake assembly without dismantling or adjusting the outer brake assembly.

12. In the brake apparatus defined in claim 11, said last means comprising a pair of rotatable anchor pins having eccentrics upon which the levers of the inner brake assembly are journaled and thereby constitute part of said adjustment mechanism and which pins pass through suitable apertures in the levers of the outer brake assembly to said open end of the drum.

LAWRENCE R. BUCKENDALE.

REFERENCES CITED

The following references are of record in the file of this patent:

UNITED STATES PATENTS

| Number | Name | Date |
|---|---|---|
| 970,738 | Nelson | Sept. 20, 1910 |
| 1,449,844 | Tansey | Mar. 27, 1923 |
| 1,486,611 | Stewart | Mar. 11, 1924 |
| 1,508,737 | White | Sept. 16, 1924 |
| 1,879,434 | Norton | Sept. 27, 1932 |
| 1,937,691 | Girling | Dec. 5, 1933 |
| 2,366,946 | Whitacre | Jan. 9, 1945 |
| 2,381,737 | Goepfrich et al. | Aug. 7, 1945 |
| 2,384,614 | Forbes | Sept. 11, 1945 |
| 2,435,955 | Buckendale et al. | Feb. 17, 1948 |